(12) United States Patent
Hetzner

(10) Patent No.: US 7,891,132 B2
(45) Date of Patent: Feb. 22, 2011

(54) MODULAR DESIGNED HANDLE/NET APPARATUS

(76) Inventor: Jess Hetzner, 42306 Remington Ave., Temecula, CA (US) 92590

(*) Notice: Subject to any disclaimer, the term of this patent is extended or adjusted under 35 U.S.C. 154(b) by 251 days.

(21) Appl. No.: 11/618,965

(22) Filed: Jan. 2, 2007

(65) Prior Publication Data

US 2008/0156715 A1    Jul. 3, 2008

(51) Int. Cl.
*A01K 77/00* (2006.01)
(52) U.S. Cl. ............... 43/12; 43/7; 43/11; 210/238
(58) Field of Classification Search ............ 43/7, 43/8, 10, 11, 12; 210/238
See application file for complete search history.

(56) References Cited

U.S. PATENT DOCUMENTS

| | | | |
|---|---|---|---|
| 2,472,572 A * | 6/1949 | Dailey | 403/217 |
| 3,004,362 A * | 10/1961 | Day | 43/12 |
| 4,446,646 A * | 5/1984 | van't Veld | 43/12 |
| 4,619,065 A * | 10/1986 | Jones | 43/12 |
| 4,870,773 A * | 10/1989 | Schmucker et al. | 43/12 |
| 5,473,786 A | 12/1995 | Resh | |
| 6,302,277 B1 | 10/2001 | Resh | |
| 6,368,502 B1 | 4/2002 | Resh | |
| 6,408,560 B1 * | 6/2002 | Bloom | 43/12 |
| 7,124,533 B2 * | 10/2006 | Kleckner | 43/12 |
| 7,269,921 B2 * | 9/2007 | Lee | 43/12 |
| 7,395,629 B1 * | 7/2008 | Thomas | 43/17.5 |

OTHER PUBLICATIONS

Purity Pool Leaf Rakes Catalog, 2 pg.

* cited by examiner

*Primary Examiner*—David J Parsley
(74) *Attorney, Agent, or Firm*—Knobbe, Martens, Olson & Bear LLP

(57) ABSTRACT

An improved tool for cleaning debris from swimming pools is provided. The tool generally comprises a frame, a net covering the mouth portion of the frame, and a modular handle/net assembly which engages the proximal "Y" portion of the frame and a multi-buttoned pole retaining clip. In certain embodiments, the handle/net has a modular design where a top stem assembly engages a bottom stem assembly which, when in this joined configuration, encloses a double-buttoned retaining clip and a portion of a frame support bar which extends from the frame. The top stem assembly and bottom stem assembly are designed to receive a locking tubular sleeve which cooperates coaxially with the outside circular rear body portion of the joined top stem assembly and bottom stem assembly and is secured in place using the double-bottomed retaining clip.

10 Claims, 4 Drawing Sheets

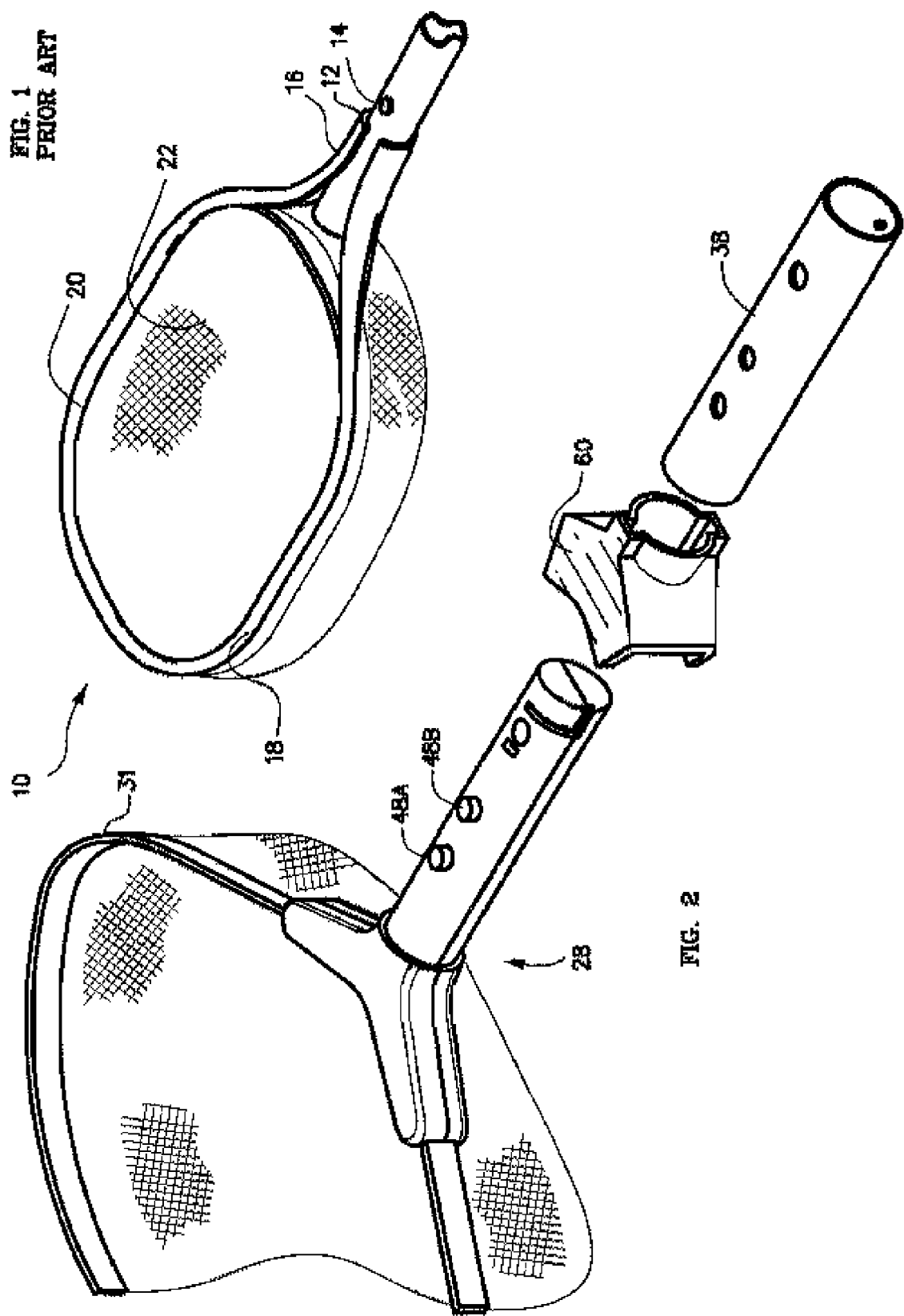

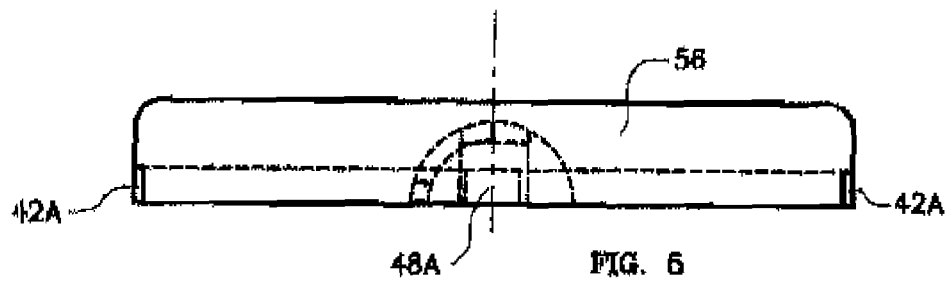
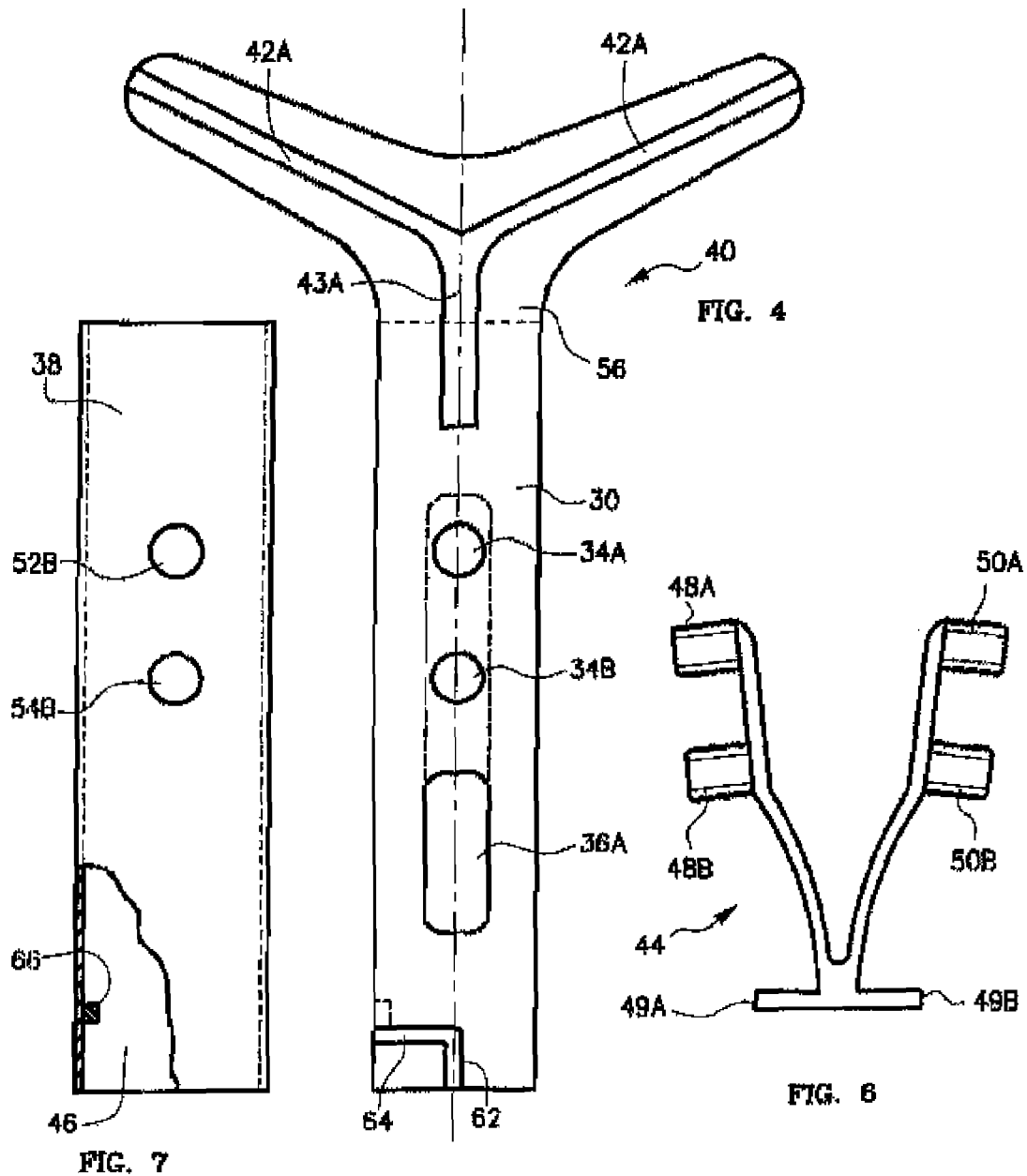

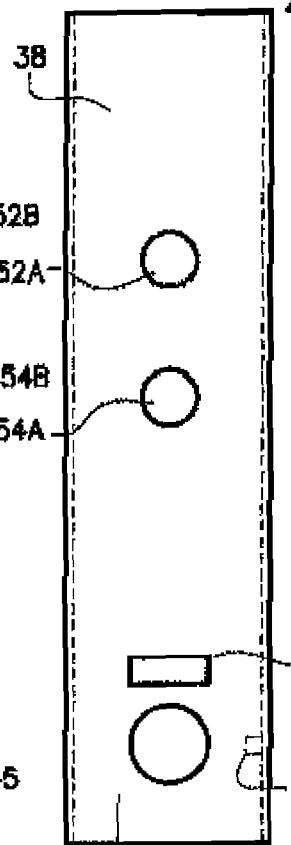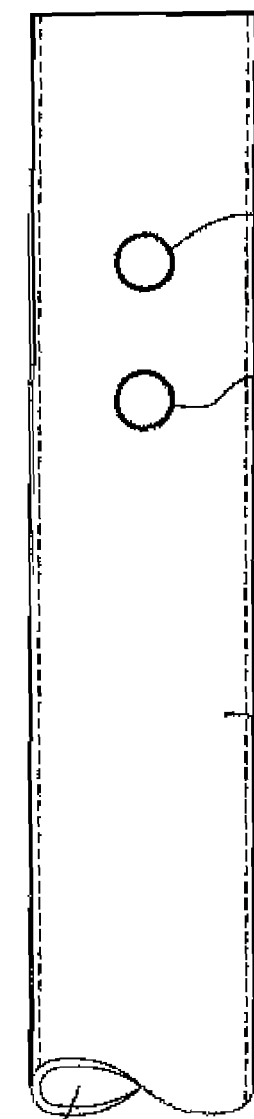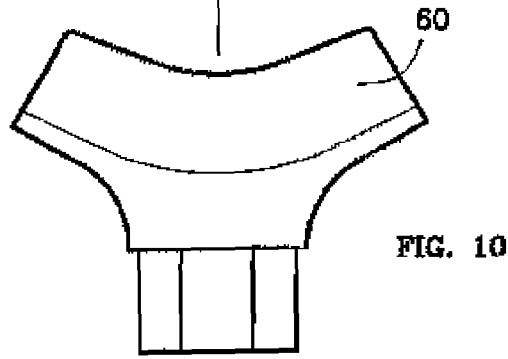

MODULAR DESIGNED HANDLE/NET APPARATUS

FIELD OF THE INVENTION

This invention relates to swimming pools, spas, decorative pools, and similar bodies of water cleaning apparatus, and in particular to "pool rakes" or "skimmers" having a neck, frame and net retained on the frame by a retaining means for removing leaves and other debris from the top and bottom surfaces of pool structure, i.e. pool bottoms, step surfaces and sloping walls.

BACKGROUND OF THE INVENTION

Prior art devices, sometimes called "pool rakes, leaf nets or skimmers", generally include a neck or stem/handle apparatus to engage long tubular handle or extended pole and a frame, the frame having an opening that is covered with a net. The net is retained on the frame by a retaining means including typically techniques, such as using clip various devices or using a folding/attachment design that allows threading over the frame. To accommodate the pool professional, there has been an attempt to employ an approach to attempt to permit replacement of parts of the rakes that tend to wear out during normal use. Such devices sometimes include a replaceable net sized and configured to fit a frame, a replaceable elongated sleeve clip to hold the net to the frame, and attachment means designed to attach the frame to a handle or pole.

These prior art attempts to permit disassembly and replacement of various parts have been less than satisfactory. One disadvantage of the prior art devices is that they require assembly or disassembly of the rakes with using various tools. Usually the first step in disassembling the rake for replacement of part requires the removal sleeve clip from the frame using a screwdriver, wrench or other tool. Sometimes this removal is so awkward or difficult that the net, the frame, and/or the clip itself can be further damaged or destroyed during the operation, or the user's hands can be injured.

Another disadvantage of the prior art pool leaf rakes is that the neck is not adequately designed to withstand the forces that are generated during normal use, and therefore breakage at the neck of the attachment point which engages the frame and the handle or pole frequently occurs. This results in catastrophic failure of the neck requiring replacement several of the pool rakes components or more commonly, complete replacement of the entire unit (and disposal of the original unit).

SUMMARY OF THE INVENTION

The present invention to provides an improved tool for cleaning debris from swimming pools, comprising a modular combination of frame means forming a mouth portion and net means covering the mouth portion, with a net retaining means for retaining the net in operative relationship with the frame means, and a modular yoke or stem assembly which engages proximal "Y" portion of the frame and a single, double or multi-buttoned pole retaining clip. In the preferred embodiment, the handle/net has a modular design where a top stem assembly that engages a bottom stem assembly which enclosed a double-buttoned retaining clip and a portion of the frame support bar which extends from the frame means and is substantial "Y" configuration designed to become engaged with the upper track of the top stem assembly and the lower track of the bottom stem assembly. The top stem assembly and bottom stem assembly is designed to receive a locking tubular sleeve which cooperates coaxially with the outside circular rear body portion of the joined top stem assembly and bottom stem assembly and is secured in place using the buttoned sleeve and pole retaining clip and/or a protruding knob and securing groove interface. In this lock configuration, the proximal Y configured section is firmly secured with of the upper and lower tracks. The mouth section of the frame and netting projected from the yoke or stem section using typical methods of using an expanded and open distal frame shaped in a circular or oval fashion, with the netting attached to the frame with a net retaining means.

It is, therefore, an object of my invention to provide an improved modular rake apparatus that includes the modular combination of frame a means forming a mouth portion and net means covering the mouth portion, with a net retaining means for retaining the net in operative relationship with the frame means, and a modular handle assembly which engages the proximal "Y" portion of the frame and a buttoned retaining clip. In the preferred embodiment, the handle/net has a modular design where a top stem assembly that engages a bottom stein assembly which enclosed a buttoned retaining clip and a portion of the frame support bar which extends from the frame means and is substantial. "Y" configuration designed to become engaged with the upper track of the top stem assembly and the lower track of the bottom stem assembly. The top stem assembly and bottom stem assembly is designed to receive a locking tubular sleeve which cooperates coaxially with the outside circular rear body portion of the joined top stem assembly and bottom stem assembly. The modular components are secured by positing the locking tubular sleeve over the top and bottom stem assemblies wherein while advancing the locking sleeve over the stem assemblies whereby a securing knob located on the inside surface of the locking sleeve follows first the insertion groove that runs substantially parallel to the longitudinal axis of the locking sleeve and then, upon rotation (approximately 20 to 60 degrees), follows a securing groove that runs substantially perpendicular to the longitudinal axis of the handle, thereby providing a first securing means. As the sleeve is advanced into the final position, a pair of holes becomes aligned with the pair or more button of the retaining clip. In this lock configuration, the proximal "Y" configured section is firmly secured with of the upper and lower tracks. The mouth section of the frame and netting projected from the neck/handle section using typical methods of using an expanded and open distal frame shaped in a variety of patterns with the netting attached to the frame with a net retaining means.

Another object of my invention is the provision of the aforementioned character in which the modular design allows for a quick and easy disassembly and assembly without the need for any tools.

Another object of the present invention is that the modular design allows for repair in the field with quick, easy to replace parts.

Another object of the present invention is that the stew/handle design and frame retention means provides for a strong and less flexible assembly joint which overcomes the disadvantages of the weak and flexible prior art stem or yoke designs.

Other objects and advantages of the invention will be apparent from the following specification and the accompanying drawings, which are for the purpose of illustration only.

BRIEF DESCRIPTION OF THE DRAWINGS

FIG. 1 is a pictorial view of a prior art pool leaf net showing the standard weak tubular pole to frame joint.

FIG. 2 is a partial exploded view of the modular designed present invention showing the general reinforced neck portion with extended handle, an optional brace, and the locking tubular sleeve.

FIG. 4 is a sectional showing an inner view of the top stem assembly showing the "Y" configured frame track and the rectangular shaped clip track having a sliding slot, a pair of holes to receive the double-buttoned pole sleeve retaining clip, and an insertion and securing groove.

FIG. 5 is a cross-section taken from FIG. 3 which shows a front view of the top stem assembly and the frame retention track.

FIG. 6 shows the double-buttoned pole retaining clip which includes a pair of protruding knobs positioned on each of two legs of the clip and clip base which as a width approaching the inside diameter of a tubular pole.

FIG. 7 shows the tubular sleeve with securing knob which is designed to keep the top and bottom stem assemblies securely engaged when in the coaxial cooperation position.

FIG. 8 is sectional showing the an inner view of the bottom stem assembly showing the "y" configured frame track and the rectangular shaped clip track having a sliding slot.

FIG. 9 is a cross-section taken from FIG. 5 which shows a front view of the bottom stem assembly frame retention track.

FIG. 10 is a perspective view of the optional stem support brace.

FIG. 11 shows another view of the tubular sleeve with securing knob which is designed to keep the top and bottom stem assemblies securely engaged when in the coaxial cooperation position.

FIG. 12 show a distal portion of the tubular pole with two pairs of holes designed to receive the retaining clip protruding knobs for securing the present invention modular handle/net apparatus to an elongated pole assembly.

DESCRIPTION OF THE PREFERRED EMBODIMENTS

Figure 3:
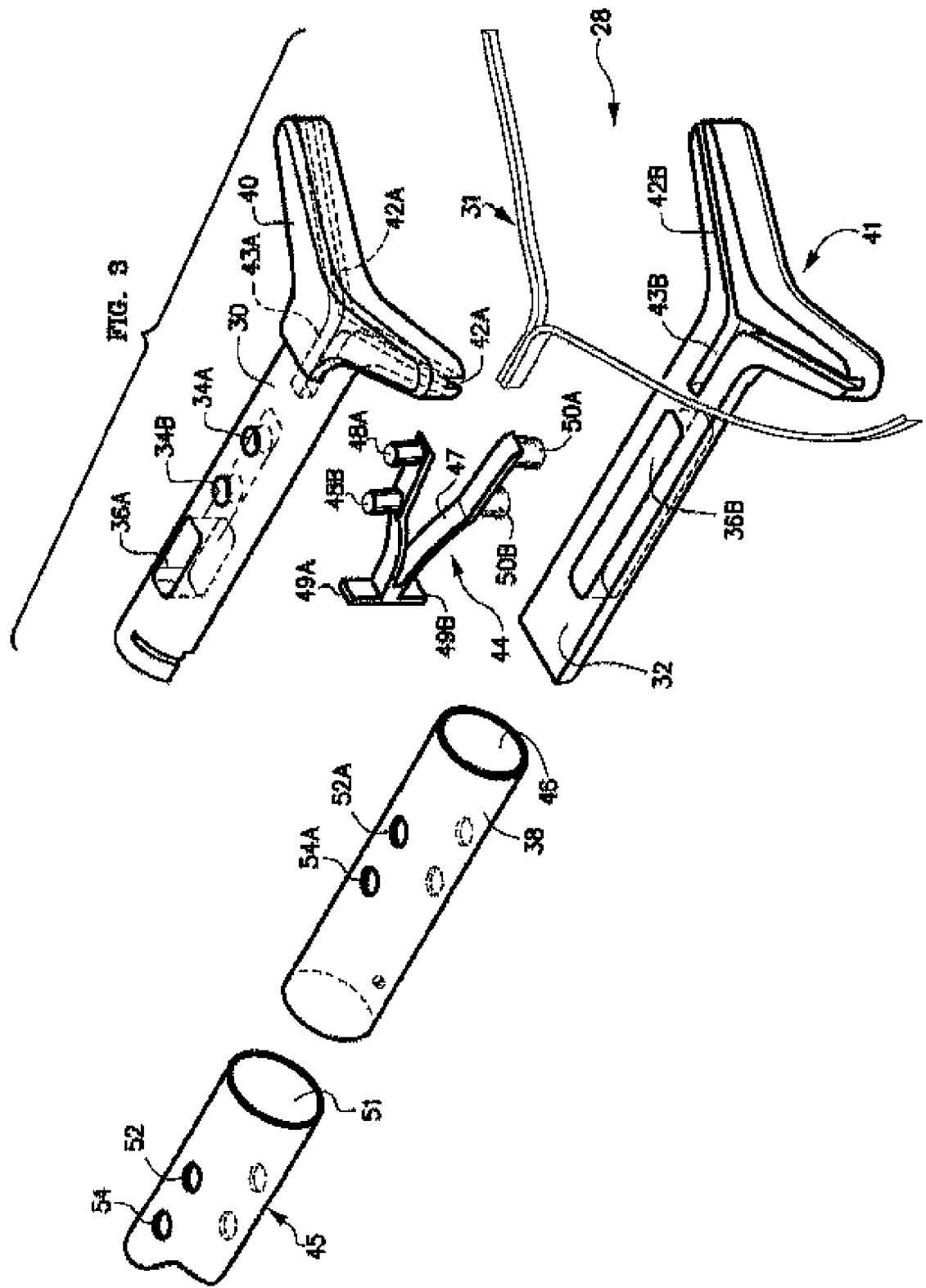
FIG. 3 is a exploded view of the modular design present invention showing a top stem assembly having a top frame track a bottom stem assembly having a bottom frame track, a buttoned pole retaining clip, a portion of the pole, and the proximal "Y" shaped portion of the frame assembly.

Referring to FIG. 1 which shows a pictorial view of a prior art rakes/nets 10. The prior art pool leaf net 10 includes a frame means 18 forming a mouth portion 22 and having conventional attachment means to the handle portion 12 with the ends of the frame secured to the attachment means 14. Also shown are the typical one pair holes 14 for attaching the prior art rakes/nets 10 to the distal end of an elongated pole member. In the preferred embodiment, the frame is generally fabricated from steel or aluminum or other suitably strong, lightweight, cost-effective material.

The prior art rakes/nets typically suffer from weak tubular pole to frame joints which are not adequately designed to withstand the forces that are generated during normal use. The prior art leaf nets 22 generally have a polymer weave and a retaining means 20 for securing the end of the net 22 to the frame 18, designed to allow water but capture debris and leave. Breakage at the neck 16 of the attachment point which engages the frame portion 18 and the handle or pole frequently occurs. This results in catastrophic failure of the neck 16 requiring replacement several of the pool rakes components or more commonly, complete replacement of the entire unit (and disposal of the original unit).

As shown in the partial exploded view of FIG. 2, in general, the modular designed present invention 28 comprises a reinforced neck portion with extend handle portion having a pair of retaining knobs 48a and 48b projecting from the extended handle portion designed to engaged the holes of the tubular sleeve 38.

In addition, as typical for pool equipment manufacturers, an optional pool apparatus whereby manufacturers include professional lines which generally has strengthen features. Shown is FIG. 2 is one such feature where an optional support brace 60 designed to cooperate with the present invention and providing additional strengthen to the neck area which, as described in the prior art, is the weak link in pool leaf nets.

Also shown in partial detail is the frame 31 which extends beyond the joined and secured top 40 and bottom 41 stem assemblies forming an open mouth portion which is covered by net member. The typical net member is fabricated frown any appropriate material, and is sized and configured to correspond with the mouth opening and to be able to retain a desired quantity of debris which may be collected in the net during use of the present invention. The net member is preferably of conventional materials and construction and is preferably configured as a bag with an opening at one end. In one example, the net is fabricated with an elongated pocket located on the upper rim which is designed to thread over the frame, when disassembled, providing a user-friendly replacement technique. The elongated pocket is fabricated by folding over a portion of the net to form the elongated pocket and maintaining this configuration using typical sowing or adhesive attached techniques. In another example, the net member is held or retained in operative relationship with the frame by using an elongated retaining strip. The strip is preferably fabricated from plastic (such as polypropylene, polyethylene, butyrate, or the like) or other suitably tough, flexible, resilient, lightweight material having sufficient shape-memory to be snapped onto, and removed from, the frame means as described herein. The channel or strip is generally U-shaped in cross-section.

The particular materials and dimensions of the frame means can be readily determined without undo experimentation for any particular size of tool, by persons of ordinary skill in the art. In addition to the preferred stainless steel material, the frame means can be fabricated from aluminum, plastic, or similar lightweight, flexible, resilient material.

Now referring to FIG. 3 is a exploded view of the modular design present invention showing a top stem assembly 30 having a top frame track 42a, a bottom stem assembly 32 having a bottom frame track 42b, a double-buttoned sleeve and pole retaining clip 44, a distal portion of the extended pole or handle 38. The proximal "Y" shaped area of the frame assembly is designed to receive the double jointed and bonded proximal end of the frame 31.

The top stem assembly 40 may be formed of a rigid polymeric material consisting of polypropylene, Nylon, Dacron, Delrin, synthetic polyamide, polytetrafluroethylene (PTFE), polyethylene, butyrate or other suitably tough, flexible, resilient, lightweight material having sufficient high tensile strength materials such as Vectran™, Kevlar™. In addition, the top stem assembly 40 may be formed from a metallic material such as steel, aluminum, or stainless steel materials. The top stem assembly 40 is machined or molded using typical machining and molding techniques to provide the "Y" shaped groove for receiving and engaging half of the diameter of the frame. The "Y" shaped groove has a pair of extending top groove portions 42a and top base portion 43a. The top stem assembly 40 also has a pair of holes 34a and 34b which penetrated the diameter of the top stem assembly 40 which receive and engage a pair of knobs 48a and 48b, or 50a and 50b, from a buttoned pole retention clip 44. A top distal sliding slot 36a is also machined or molded into the top stem assembly 40 which penetrates the diameter of the top stem assembly 40 and is designed to engage and contain a pair of extended base pieces 49a and 49b on the buttoned pole retention clip 44. Also shown is a proximal cut-tout area 36a near the pair of holes 34a and 34b.

Also shown in FIG. 3 is the double buttoned sleeve and pole retaining clip 44 which includes a pair of protruding knobs 48a and 48b, and 50a and 50b, positioned on each of two legs of the clip 44. The double-buttoned sleeve and pole retaining clip 44 has a pair of extended base pieces 49a and 49b which extend slightly beyond the limits of the top stem assembly 40 distal sliding slot 36a and has a width approaching the inside diameter of a tubular pole or handle 38. It is anticipated by the Applicant that other types of retaining clips, including the standard single pair design used with prior art devices, having one or more protruding buttons can be specifically designed to also work with the present invention.

The bottom stem assembly 41 may be formed of a rigid polymeric material consisting of polypropylene, Nylon, Dacron, Delrin, synthetic polyamide, polytetrafluroethylene (PTFE), polyethylene, butyrate or other suitably tough, flexible, resilient, lightweight material having sufficient high tensile strength materials such as Vectran™, Kevlar™. In addition, the bottom stem assembly 41 may be formed from a metallic material such as steel, aluminum, or stainless steel materials. The bottom stem assembly 41 is machined or molded using typical machining and molding techniques to provide the "Y" shaped groove for receiving and engaging half of the diameter of the frame. The "Y" shaped groove has a pair of extending top groove portions 42b and top base portion 43b. A extended bottom distal sliding slot 36b is also machined or molded into the bottom stem assembly 41 which penetrates the diameter of the bottom stem assembly 41 and is designed to engage and contain a pair of extended base pieces 49a and 49b on the buttoned pole retention clip 44.

Also shown in FIG. 3 is the tubular sleeve 38 has an inside diameter 46 which is slightly smaller than the diameter that results when the top assembly 40 and bottom assembly 41 are joined. The tubular sleeve 38 is designed to keep the top and bottom stem assemblies securely engaged when positioned coaxially over the modularly designed top 40 and bottom 41 structures. The tubular sleeve 38 is fitted with a pair of distal holes 52a and proximal holes 54a on each side of the tubular structure is designed to receive retaining clip knobs 45a and 48b on one side, and 50a and 50b on the other side. Once the tubular sleeve 38 is positioned over the top and bottom assemblies, it is rotated approximately 45 degrees whereby the pair of holes 52a and 54a lines up with the retaining clip knobs 48a, 48b, 50a, and 50b. The present invention 28 is now ready for use by the operator. Optionally, an elongated pole 45 with a inside diameter 51 which is slightly larger that the outer diameter of the tubular sleeve 38, can be coaxially slide over the tubular sleeve and secured with the appropriate knobs inserted into the pair of holes 54 and 52

FIG. 4 shows, in more detail, the inner details of the top stem assembly 40. The top stem assembly 40 has a "Y" configured frame trail 42a and second joint portion 43a and the rectangular shaped clip track having a sliding slot 36a and a pair of holes 34a and 34b. The area around the neck region of the stem is heavily reinforced by using substantially rigid materials with substantial girth or mass to reduce flexing and inhibit the formation of fatigue fractures at this weak point. The "Y" shaped groove 42a and 43a in the top stem assembly 40 is adapted to tightly enclose approximately one half of the width a rectangular or planar shaped frame. In addition, a butted joint assembly of two rectangular or planar frame end pieces can be joined by welding, adhesive or other technology and fitted with the second joint portion 43a. The rectangular shaped clip track having a sliding slot 36a and a pair of holes 34a and 34b are designed to receive and cooperate with the double buttoned sleeve and pole retention clip 44.

Located on the proximal end of the handle portion of the top stem assembly 40 is a insertion groove 62 and a securing groove 64, which is designed to engage a securing knob 66 located in the inside wall of the tubular sleeve 38 (shown in more detail in FIG. 7).

FIG. 5 is a cross-section taken from FIG. 3 which shows a front view of the top stem assembly and the frame retention track.

FIG. 6 shows the preferred double-buttoned sleeve and pole retaining clip 44 which includes a pair of protruding knobs 48a and 48b, and 50a and 50b, positioned on each of two legs of the clip. The retaining clip 44 is designed to be sandwiched between the top stem assembly 40 and bottom stem assembly 41, and cooperate with first guide hole 36a and holes 34a and 34b of the top stem assembly 40 and the second guide hole in the bottom stein assembly (FIG. 8). The base of the retaining clip 44 has a pair of ears 49a and 49b which have a width that approaches the inside diameter of the tubular sleeve. It is anticipated by the Applicant that other types of retaining clips, including the standard single pair design used with prior art devices, having one or more protruding buttons can be specifically designed to also work with the present invention.

FIG. 7 shows the tubular sleeve with securing knob which is designed to keep the top and bottom stem assemblies securely engaged when in the coaxial cooperation position. Once the tubular sleeve 38 is positioned over the top and bottom stem assemblies 40 and 41 respectively, the sleeve is rotated approximately 45 degrees whereby the securing knob 66 follows first the insertion groove 62 and then, upon rotation, follows the securing groove 64, thereby providing additional securing means.

FIG. 8 is a sectional showing the inside view of the bottom stem assembly 41 having a "Y" configured frame track 42b and second joint portion 43b and an elongated rectangular shaped clip track sliding slot 56b. The area around the neck region of the stem is heavily reinforced by using substantially rigid materials with substantial girth or mass to reduce flexing and inhibit the formation of fatigue fractures at this weak point. The "Y" shaped groove 42b and 43b in the bottom stem assembly 41 is adapted to tightly enclose approximately the other one half of the width a rectangular or planar shaped frame. In addition, a butted joint assembly of two rectangular or planar frame end pieces can be joined by welding, adhere or other technology and fitted with the second joint portion 43b. The rectangular shaped clip track sliding slot 56b is designed to receive and cooperate with the double-buttoned retention clip 44.

FIG. 9 is a cross-section taken from FIG. 5 which shows a front view of the bottom stem assembly frame retention track.

FIG. 10 is a perspective view of the optional stem support brace 60. Typically pool equipment manufacturers offer an optional pool rakes whereby manufacturers include professional lines which generally have improved features. The optional support brace 60 is an improved feature designed to cooperate with the present invention and providing additional strengthen to the neck area which, as described in the prior art, is the weak link in pool leaf nets.

FIG. 11 shows another view of the tubular sleeve 38 with securing knob 66 on the inside surface of the lumen which is designed to keep the top and bottom stem assemblies securely engaged when coaxially engaging the top stem assembly 40 and the bottom stem assembly 41. Once the tubular sleeve 38 is positioned over the top and bottom stein assemblies 40 and 41 respectively, the sleeve is rotated approximately 45 degrees whereby the securing knob 66 follows first the insertion groove 62 and then, upon rotation, follows the securing groove 64, thereby providing additional securing means.

FIG. 12 show a distal portion of the tubular pole 45 with two pairs of holes 54b and 52b designed to receive the retaining clip protruding knobs for securing the present invention modular handle/net apparatus to an elongated pole assembly.

Modular Engagement and Operation

Persons of ordinary skill in the art will understand that, although the present invention comprised of several sections, the modular design allows for easy assembly and disassembly and further the engage of the modular components allows for efficient service in the field. When the distal end of the locking sleeve 38 is coaxially inserted over the joined upper stem assembly 40 and bottom stem assembly 41, and secured by the enclosed multi-buttoned sleeve and pole retention clip 44, the proximal section of the frame member 31 is securely engaged within the upper and lower frame tracks. The present invention now provides a robust neck and stem assembly for pool cleaning operations.

Once the leaf net assembly is introduced into approximate conformance with the surface or pool volume to be cleaned, the present invention assembly is pushed across that surface or pool volume to capture debris in the net.

The present invention modular handle/net apparatus and method of the Applicant's invention has been described with some particularity but the specific designs, constructions and steps disclosed are not to be taken as delimiting of die invention in that various modifications will at once make themselves apparent to those of ordinary skill in the art, all of which will not depart from the essence of the invention and all such changes and modifications are intended to be encompassed within the appended claims.

I claim:

1. A modularly designed handle/net apparatus for cleaning debris, said modular apparatus comprising:
    a frame, said frame having a central opening covered by a net, said frame having a proximal section and a distal extended section;
    a retaining member for retaining said net on said distal extended section of said frame;
    a buttoned retaining clip, said buttoned retaining clip comprising a plurality of flexible arms and one or more buttons disposed on each arm, said buttoned retaining clip further comprising a base portion extending laterally from the flexible arms in the same direction that the buttons extend from the arms;
    a locking sleeve assembly;
    a two piece stem apparatus having a Y-shaped configuration and Y-shaped tracks adapted to receive the proximal section of said frame, said two piece stem apparatus having a top assembly and a bottom assembly, said two piece stem apparatus enclosing said buttoned retaining clip; and said two piece stem apparatus having a proximal section which is designed to coaxially engage the locking sleeve assembly; a proximal section of said locking sleeve assembly having one or more holes designed to engage one or more buttons of said buttoned retaining clip and having a function to secure said two piece stem apparatus engaged together, wherein the top or bottom assembly has a sliding slot configured to engage the base portion on the buttoned retaining clip;
    a securing groove, wherein the securing groove is disposed within an outside surface of the top or bottom assembly; and
    one or more knobs, wherein the one or more knobs is located on an inside surface of a distal section of the locking sleeve assembly and designed to engage the securing groove and having a function to further secure the two piece stem apparatus engaged together.

2. The modularly designed handle/net apparatus of claim 1, wherein said one or more buttons comprises protruding knobs adapted to engage one or more holes in said locking sleeve assembly.

3. The modularly designed handle/net apparatus of claim 1, wherein said top stem assembly is formed of a rigid polymeric material selected from the group consisting of polypropylene, Nylon, Dacron, Delrin, synthetic polyamide, polytetrafluoroethylene (PTFE), polyethylene, butyrate, and combinations thereof.

4. The modularly designed handle/net apparatus of claim 1, wherein said top stem assembly is formed from a metallic material selected from the group consisting of steel, aluminum, stainless steel, and combinations thereof.

5. The modularly designed handle/net apparatus of claim 1, wherein said bottom stem assembly is formed of a rigid polymeric material selected from the group consisting of polypropylene, Nylon, Dacron, Delrin, synthetic polyamide, polytetrafluroethylene (PTFE), polyethylene, butyrate, and combinations thereof 6. The modularly designed handle/net apparatus of claim 1, wherein said top and said bottom assembly are formed from a rigid polymeric material.

7. The modularly designed handle/net apparatus of claim 1, wherein said top and said bottom assembly are formed from a metallic material.

8. The modularly designed handle/net apparatus of claim 1, wherein said top and said bottom assembly are formed from either a rigid polymeric material or a metallic material.

9. The modularly designed handle/net apparatus of claim 1, further comprising said locking sleeve assembly having a outside diameter and an outside surface; said outside surface is designed to coaxially engaged an extended pole assembly.

10. The modularly designed handle/net apparatus of claim 1, further comprising a stem support brace.

* * * * *

UNITED STATES PATENT AND TRADEMARK OFFICE
CERTIFICATE OF CORRECTION

| | | |
|---|---|---|
| PATENT NO. | : 7,891,132 B2 | Page 1 of 1 |
| APPLICATION NO. | : 11/618965 | |
| DATED | : February 22, 2011 | |
| INVENTOR(S) | : Jess Hetzner | |

It is certified that error appears in the above-identified patent and that said Letters Patent is hereby corrected as shown below:

At Column 1, line 35, please change "part" to --parts--;

At Column 2, line 21, please change "stein" to --stem--;

At Column 2, line 23, please change "substantial." to --substantial--;

At Column 2, line 55, please change "stew/" to --stem/--;

At Column 3, line 7, please change "track" to --track,--;

At Column 3, line 26, please change ""y"" to --"Y"--;

At Column 4, line 15, please change "frown" to --from--;

At Column 5, line 5, please change "cut-tout" to --cut-out--;

At Column 5, line 45, please change "45a" to --48a--;

At Column 5, line 55, please change "trail" to --track--;

At Column 5, line 61, please change "stern" to --stem--;

At Column 6, line 21, please change "stein" to --stem--;

At Column 6, line 49, please change "adhere" to --adhesive--;

At Column 7, line 2, please change "stein" to --stem--;

At Column 7, line 31 (appx), please change "die" to --the--;

At Column 8, line 38, Claim 5, please change "thereof" to --thereof.--.

Signed and Sealed this
Eleventh Day of October, 2011

David J. Kappos
*Director of the United States Patent and Trademark Office*